United States Patent [19]
Pastrick

[11] Patent Number: 5,133,247
[45] Date of Patent: Jul. 28, 1992

[54] COFFEE MAKER

[75] Inventor: John Pastrick, Parma, Ohio

[73] Assignee: Mr. Coffee, Inc., Bedford Heights, Ohio

[21] Appl. No.: 640,059

[22] Filed: Jan. 11, 1991

[51] Int. Cl.$^5$ .............................................. A47J 31/24
[52] U.S. Cl. ...................................... 99/295; 99/299
[58] Field of Search ................. 99/279, 299, 295, 300, 99/304, 305, 306, 307, 316; 426/433

[56] References Cited

U.S. PATENT DOCUMENTS

| | | | |
|---|---|---|---|
| 4,467,707 | 8/1984 | Amiot | 99/279 |
| 4,667,587 | 5/1987 | Wunder | 99/295 |
| 4,798,222 | 1/1989 | Kauffman | 99/299 |
| 4,811,657 | 3/1989 | Rixen | 99/295 |
| 4,833,978 | 5/1989 | Martone | 99/299 |
| 4,843,955 | 7/1989 | Henn | 99/295 |
| 4,924,922 | 5/1990 | Johnson | 99/279 |

FOREIGN PATENT DOCUMENTS 0019291  5/1980  European Pat. Off. .

*Primary Examiner*—Robert W. Jenkins
*Attorney, Agent, or Firm*—D. Peter Hochberg; Mark Kusner; Louis J. Weisz

[57] ABSTRACT

An electric coffee maker comprised of a housing, having structure defining a carafe receiving position and support means disposed above the carafe receiving position. A filter/brew funnel dimensioned to be supported by the support means above the carafe receiving position is provided to receive brewing particulate and brewing water. The filter/brew funnel includes an outlet port and valve means operable to pen and close the outlet port. The valve means include a valve, a valve lever supporting the valve, which lever is movable between a first position wherein the valve closes the outlet port and a second position wherein the valve is disposed away from the outlet port, and biasing means for biasing the valve lever toward the first position. An elongated actuator is pivotally mounted about a generally horizontal axis to the housing. The actuator includes an upper arm dimensioned to engage the valve lever when the brew funnel is supported by the support means and a lower end dimensioned to engage the side of a carafe position within the carafe receiving position. The actuator is biased by the biasing means of the valve means toward a first position wherein the lower end of the actuator is disposed within the space normally occupied by a carafe in the carafe receiving position.

5 Claims, 5 Drawing Sheets

COFFEE MAKER

FIELD OF THE INVENTION

The present invention relates generally to an apparatus for brewing beverages such as coffee, tea and the like, and more particularly to an anti-drip valve assembly for use with an automatic, drip-type coffee maker.

BACKGROUND OF THE INVENTION

Numerous types of anti-drip valve attachments for use in automatic drip-type coffee makers are known. Such valves are generally located at the outflow opening of a coffee maker's filter/brew funnel. A primary object of such anti-drip valves is to prevent coffee from continually flowing or dripping out from the filter/brew funnel when the decanter or carafe is removed from the coffee maker or if the filter/brew funnel itself is removed from the coffee maker (the filter/brew funnel containing ground coffee saturated with brewing water).

Consumers however, have discovered that the carafe may be temporarily removed during the brewing cycle and that the anti-drip valve will prevent coffee from continually flowing out of the filter/brew funnel. In many instances, removal of the carafe by a user during the brewing cycle is to obtain a cup of coffee without waiting for the complete cycle of the coffee maker. In such instances, with the carafe removed, the anti-drip valve will close during the brewing cycle, wherein the brewing water builds up in the filter/brew funnel and is released when the carafe is returned to the coffee maker.

The anti-drip valve arrangement associated with coffee makers known heretofore generally operate by means of a spring biased lever or arm engaging a lid on the carafe. The lid typically includes a centrally located, funneled opening to direct dripping coffee from the filter/brew funnel into the carafe. The lever or arm of the anti-drip valve arrangement generally engages the lid of the carafe and is deflected upward to open the anti-drip valve when the carafe is in position below the filter/brew funnel.

One problem with such arrangement is that as the carafe is replaced in the coffee maker, some portion of the upper edge of the carafe typically engages the lever or arm of the valve mechanism. In this respect, a downward force is generally exerted on the carafe by the spring-biased arm or lever acting on the lid. Depending on the biasing force which must be overcome, replacement of a carafe, especially one which may be partially filled with brewed coffee or tea, can be awkward and even difficult. Moreover, if the carafe is not replaced "straight on" or in a horizontal position, the upper edge of the carafe or lid may "catch" or "snag" the lever or arm of the valve mechanism thereby creating difficulties in proper realignment and placement of the carafe. In similar respects, removal of the filter/brew funnel can likewise be awkward or difficult due to interference between the anti-drip valve lever or arm and the upper surfaces of the carafe and lid.

A more important problem, however, is that if the lid of the carafe is removed for any reason during this temporary removal of the carafe, and the carafe is returned to the coffee maker without the lid, the anti-drip valve mechanism will not operate. In this respect, if the lid of the carafe is removed before or during a brewing cycle, a continual backup of water can occur in the filter/brew funnel during the brewing cycle, which backup will eventually overflow the filter/brew funnel. Such occurrence produces not only an undesirable and messy spill, but users may be scalded by the heated water in attempting to open the anti-drip valve or remove the filter/brew funnel from the coffee maker.

The present invention overcomes these and other problems by providing an electric coffee maker having an anti-drip valve mechanism actuated through engagement with the side of the carafe, which mechanism provides noticeably less resistance to replacement of the carafe and prevents accidental spills or coffee flow if the carafe is replaced in the coffee maker without its lid.

SUMMARY OF THE INVENTION

In accordance with the present invention, there is provided electric coffee maker comprised of a housing having structure defining a carafe receiving position and support means disposed above the carafe receiving position. A filter/brew funnel dimensioned to be supported by the support means above the carafe receiving position is provided to receive brewing particulate and brewing water. The filter/brew funnel includes an outlet port and valve means operable to open and close the outlet port. The valve means include a valve, a valve lever for supporting the valve, which lever is movable between a first position wherein the valve closes the outlet port and a second position wherein the valve is disposed away from the outlet port, and biasing means for biasing the valve lever toward the first position. An elongated actuator is pivotally mounted about a generally horizontal axis to the housing. The actuator includes an upper arm dimensioned to engage the valve lever when the filter/brew funnel is supported by the support means and a lower arm dimensioned to engage the side of a carafe positioned within the carafe receiving position. The actuator is biased by the biasing means of the valve means toward a first position wherein the lower arm of the actuator is disposed within the space normally occupied by a carafe in the carafe receiving position. The lower arm of the actuator is movable by a carafe placed in the carafe receiving position which causes the actuator to move to a second position wherein the upper arm is operable to move the valve lever to its second position.

In accordance with another aspect of the present invention, there is provided a coffee maker as described above, wherein the outlet port of the filter/brew funnel includes a drip surface disposed below the valve lever and valve.

It is an object of the present invention to provide an appliance for automatically brewing coffee, tea or the like, having an improved anti-drip valve mechanism.

Another object of the present invention is to provide a coffee maker as described above for use with a carafe wherein the anti-drip valve mechanism is operable with or without a cap being on the carafe.

Another object of the present invention is to provide a coffee maker as described above wherein the anti-drip valve mechanism includes actuating means operable upon engagement with the side of a carafe.

Another object of the present invention is to provide a coffee maker as described above wherein the operative component engaging the carafe is reciprocally movable in a horizontal direction.

Another object of the present invention is to provide a coffee maker as described above which enables replacement of the carafe without noticeable opposition by the anti-drip valve mechanism.

Another object of the present invention is to provide a coffee maker as described above having a brew funnel and an anti-drip valve mechanism associated therewith wherein the filter/brew funnel has an outlet drip surface disposed below the anti-drip valve mechanism.

A still further object of the present invention is to provide an anti-drip valve mechanism for an electric, automatic drip coffee maker, which anti-drip valve mechanism is inexpensive, reliable and easy to use.

These and other objects and advantages will become apparent from a reading of the following description considered with the drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part thereof and wherein.

DETAILED DESCRIPTION OF THE PREFERRED EMBODIMENT

Figure 1:
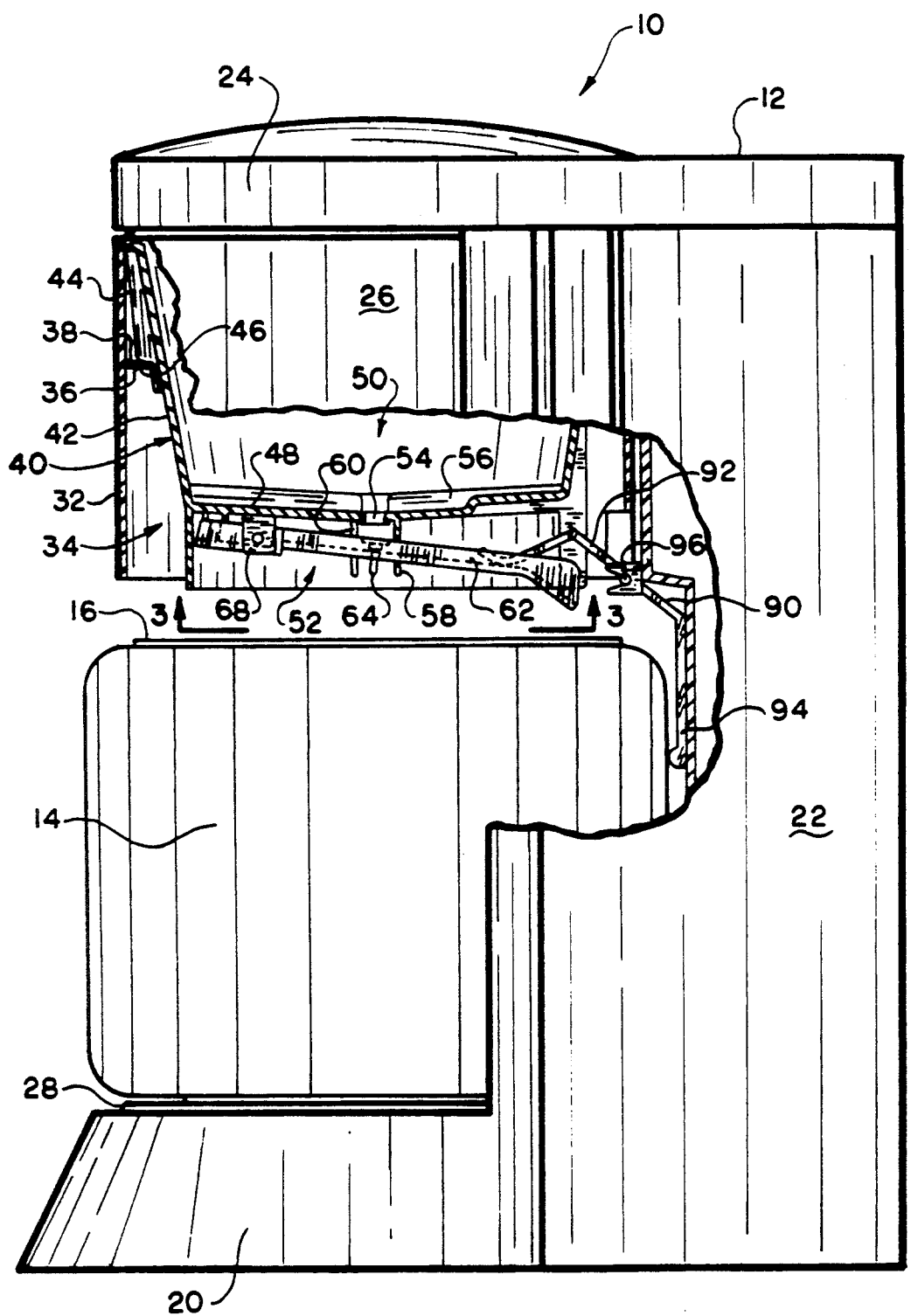
FIG. 1 is a partially-sectioned side elevational view of a coffee maker illustrating an anti-drip valve mechanism according to the present invention.

Referring now to the drawings wherein the showing is for the purpose of illustrating the preferred embodiment of the invention only, and not for the purpose of limiting same, FIG. 1 shows an appliance 10 for making coffee, tea or the like. Broadly stated, appliance 10 is comprised of a housing 12 dimensioned to receive a carafe 14 which includes a cover 16. In the embodiment shown, housing 12 generally includes a flared base 20, a vertical column 22, a cap 24 and a generally cylindrical closure 26. Base 20 includes a warming plate 28 which is dimensioned to define a carafe receiving position which is operable to locate carafe 14 in a predetermined position with respect to housing 12. Base 20, column 22 and cap 24 contain a water reservoir, water heating element and other operative components which are conventionally known in automatic-drip coffee makers. These components (i.e. the water reservoir, water heating element and other operative components) in and of themselves form no part of the present invention and therefore shall not be described.

Closure 26 is dimensioned to receive and hold a filter/brew funnel 40. To this end, closure 26 includes a generally cylindrical wall 32 which is opened at both its upper and lower ends and which defines an internal, generally cylindrical cavity 34. In the embodiment shown, closure 26 also includes two, generally symmetrical projections 35, best seen in FIG. 2. Closure 26 is pivotally mounted to housing 12 to pivot about a generally vertical axis designated "X" in FIG. 2 which axis extends through one projection 35 and enables closure 26 to swing out from under cap 24 in a manner conventionally known, so as to enable filter/brew funnel 40 to be inserted from above. Support means for supporting filter/brew funnel 40 within closure 26 are provided in the form of an annular flange 36 which projects inwardly from the inner surface of wall 32. Flange 36 defines an upward facing annular surface 38.

Figure 2:
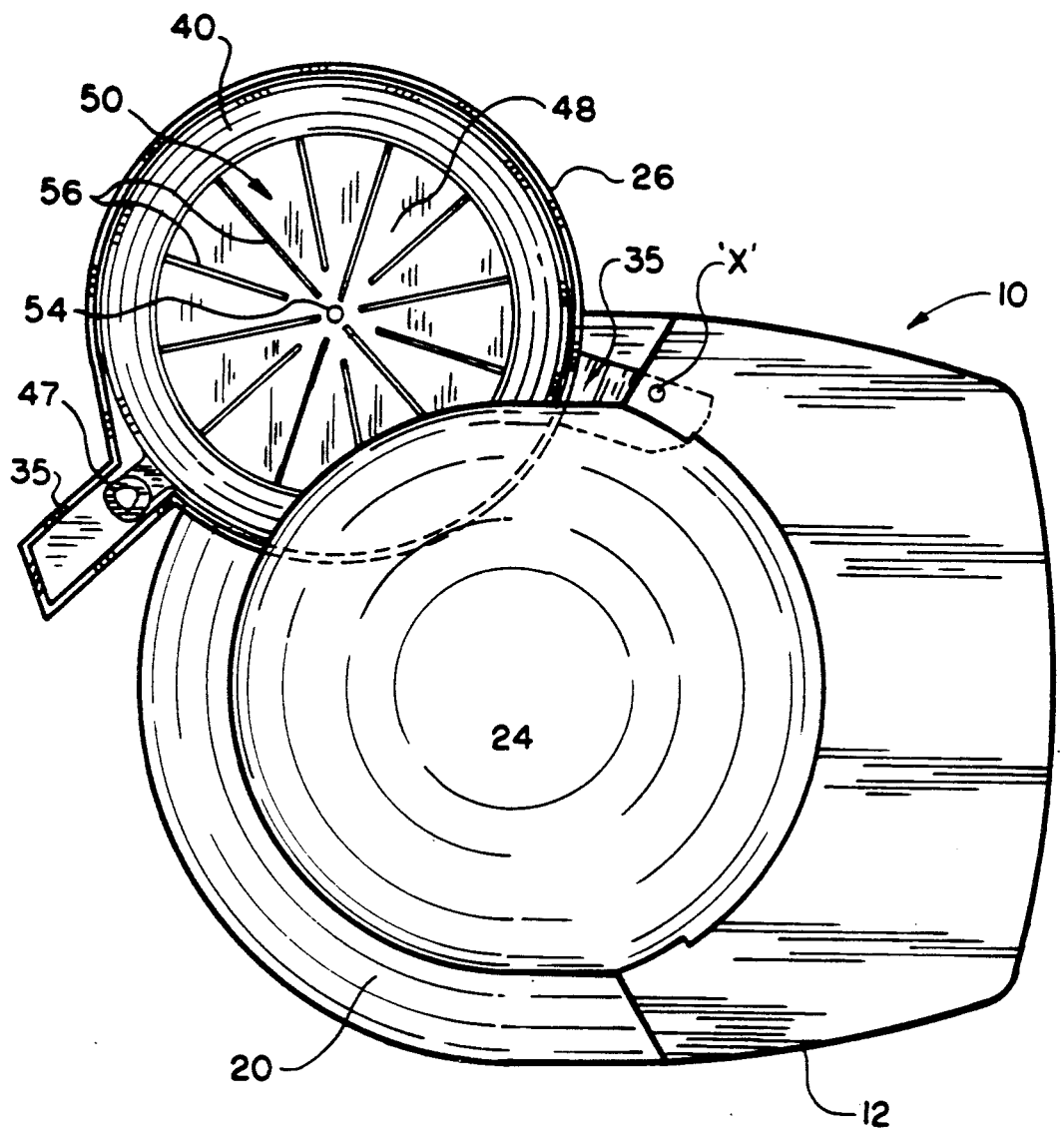
FIG. 2 is a top plan view of the coffee maker shown in FIG. 1.

Referring now to filter/brew funnel 40, such funnel is generally cylindrical in shape and is dimensioned to be received within closure 26. More specifically, filter/brew funnel 40 includes a generally cylindrical wall 42 having a flared collar portion 44 at the upper end thereof, which collar portion 44 defines a downward facing annular edge 46 dimensioned to rest on annular surface 38 of closure wall 32. Collar 44 of filter/brew funnel 40 and flange 36 of closure 26 preferably include interlocking, locating means to position filter/brew funnel 40 in a preferred orientation within closure 26. In the embodiment shown, filter/brew funnel 40 includes an outward projecting tab 47 dimensioned to be received in one of the projections 35, as shown in FIG. 2, which tab 47 permits insertion of filter/brew funnel 40 in closure 26 in only one position. Near the lower end of cylindrical wall 42, a slightly conical transverse wall 48 is provided and defines an upper cavity 50 and a lower cavity 52. Upper cavity 50 is adapted to be a "wetting" chamber for holding coffee, tea or the like, and is therefore dimensioned to receive a typical filter (not shown). Filter/brew funnel 40 also includes an outlet port 54 disposed at the lowermost portion of conical wall 48. A plurality of elongated ribs 56 radiating outward from outlet port 54 are provided on the upper surface of conical wall 48 to facilitate drainage through outlet port 54.

Figure 3:
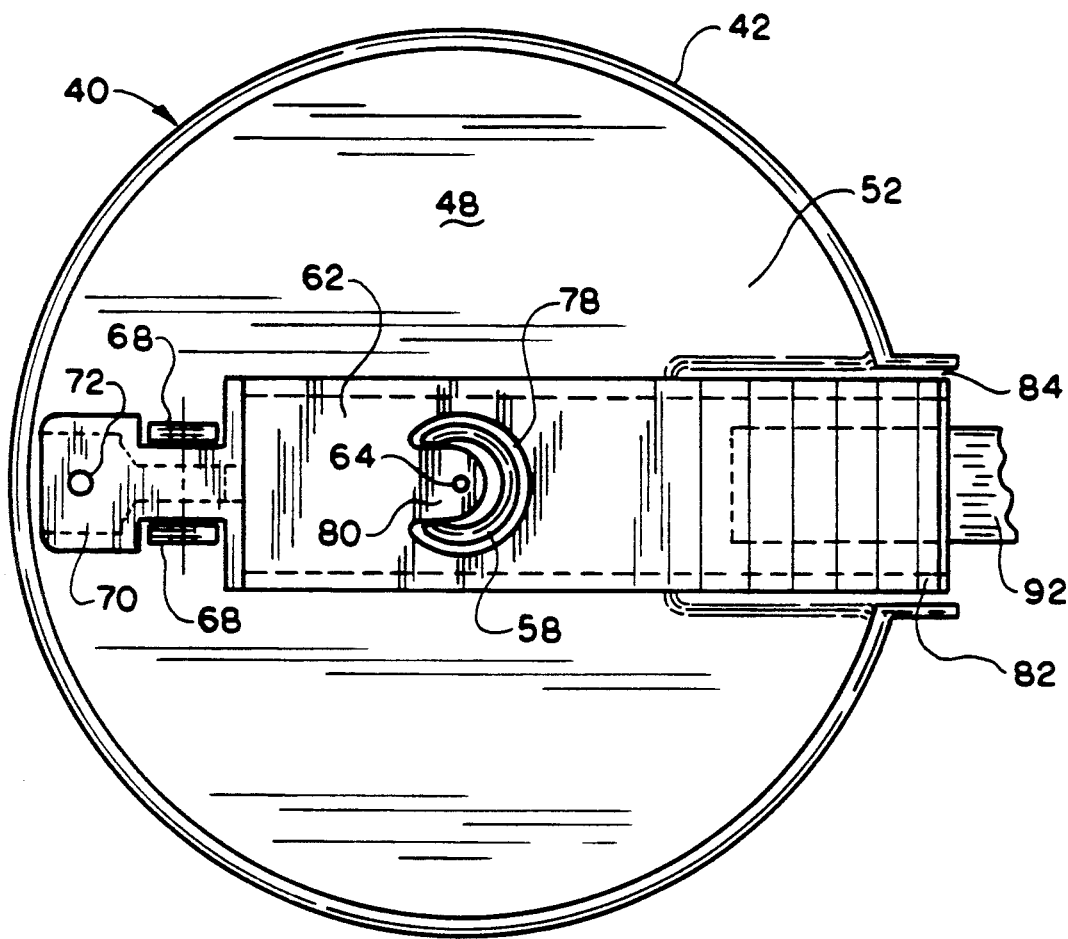
FIG. 3 is a bottom plan view taken along Line 3—3 of FIG. 1.

According to one aspect of the present invention, a tubular extension 58 is disposed about outlet 54 and extends downward from the lower surface of conical wall 48. Extension 58 is generally cylindrical in shape and includes an opening 60 on one side thereof. In this respect, extension 58 is generally crescent-shaped, as best seen in FIG. 3.

Within cavity 52, a valve arrangement for opening and closing outlet port 54 is provided. The valve arrangement is generally comprised of a valve lever 62 having a valve or plug 64 mounted thereon. Valve lever 62 is pivotally mounted by a pin 66 to a pair of lugs 68 which extend downward from the lower surface of conical wall 48. Valve lever 62 includes a first end 70 having a pin 72 formed thereon. Pin 72 is dimensioned to receive and contain a compression spring 74. A generally cylindrical boss 76 formed on the lower surface of conical wall 48 is provided to position spring 74 relative to pin 72. Compression spring 74 is operable to bias lever 62 toward a first position wherein plug or valve 64 covers outlet port 54 thereby preventing flow therethrough. As best seen in FIG. 3, lever 62 includes a generally crescent-shaped opening 78, is dimensioned to receive tubular extension 58 therethrough. Opening 78 defines a tab 80 in valve lever 62 on which plug 64 is mounted. Tab 80 is dimensioned to be received and move freely within the space bounded by tubular extension 58. In the embodiment shown, the opening 60 of tubular extension 58 faces toward the pinned end of valve lever 62. Valve lever 62 also includes a second or free end 82, which in the embodiment shown, extends slightly beyond cylindrical wall 42, as best seen in FIG. 3. In this area, cylindrical wall 42 has been modified to include an opening 84 to accommodate free end 82 of valve lever 62. Free end 82 of valve lever 62 is formed to include a ramp 86.

The operation of valve lever 62 is controlled by an actuator 90 which is pivotally mounted to housing 12. Actuator 90 includes a first upper arm 92 dimensioned to operatively engage free end 82 of valve lever 62. As shown in the drawings, upper arm 92 extends through opening 84 and cylindrical wall 42 of filter/brew funnel 40 and is normally disposed between the lower surface of conical wall 48 and the upper surface of valve lever 62. Actuator 90 further includes a lower arm 94 which is dimensioned to engage the side 14a of carafe 14. In the embodiment shown, actuator 90 is integrally formed to include a pivot pin 96. Pin 96 is dimensioned to be snap-locked into a bracket 98 on housing 12, wherein actuator 90 is freely pivotable about pin 96.

Figure 4:
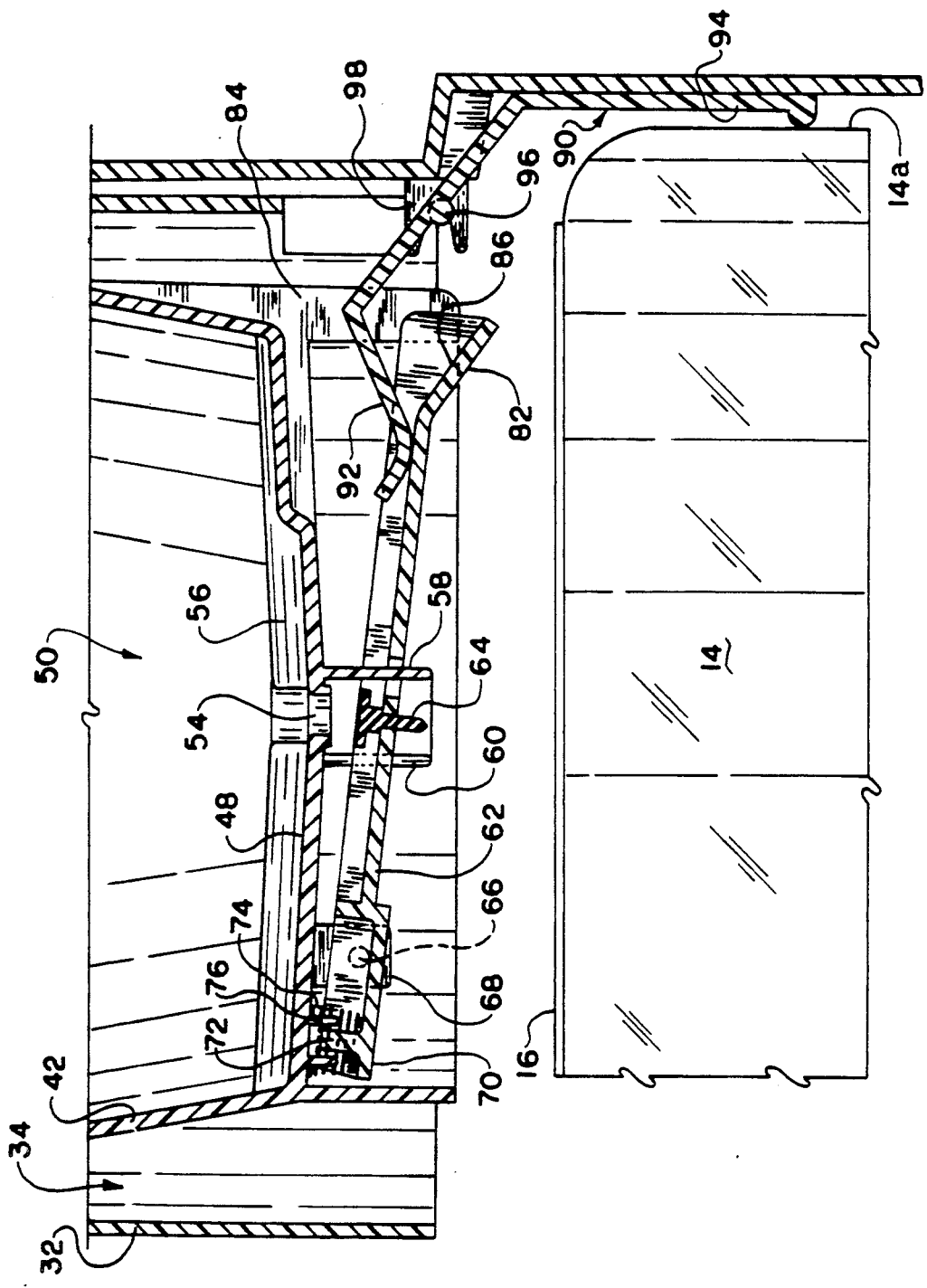
FIG. 4 is an enlarged view illustrating the operative components of the anti-drip valve mechanism shown in FIG. 1 showing the valve mechanism in an open position.

Referring now to the operation of the present invention, FIG. 1 shows appliance 10 configured for a normal brewing cycle. In this respect, carafe 14 is positioned on warming plate 28 and side 14a of carafe 10 engages lower arm 94 of actuator 90 and causes actuator 90 to move to a position as illustrated in FIGS. 1 and 4. In this position, upper arm 92 of actuator 90 maintains valve lever 62 in a second position wherein valve or plug 64 does not obstruct outlet port 54, the weight of carafe 14 alone being sufficient to overcome the force of compression spring 74. In this position, a brewing cycle may be initiated in a manner which is conventionally known, and brewed coffee can flow from filter/brew funnel 40 through outlet port 54 into carafe 14. Importantly, according to one aspect of the present invention, tubular extension 54 prevents coffee flowing through outlet port 54 from flowing down the inclined valve lever 62 by providing a drip surface which extends below lever 62. In other words, tubular extension 58 basically extends port 54 below valve lever 62 such that coffee flowing out of outlet port 54 drips off the lower most edge of tubular extension 58 and prevents flow across the upper surface of valve lever 62. In this respect, any brewed liquid dripping onto the upper surface of tab 80 is confined within tubular extension 58 and thereby prevented from flowing along valve lever 62.

Figure 5:
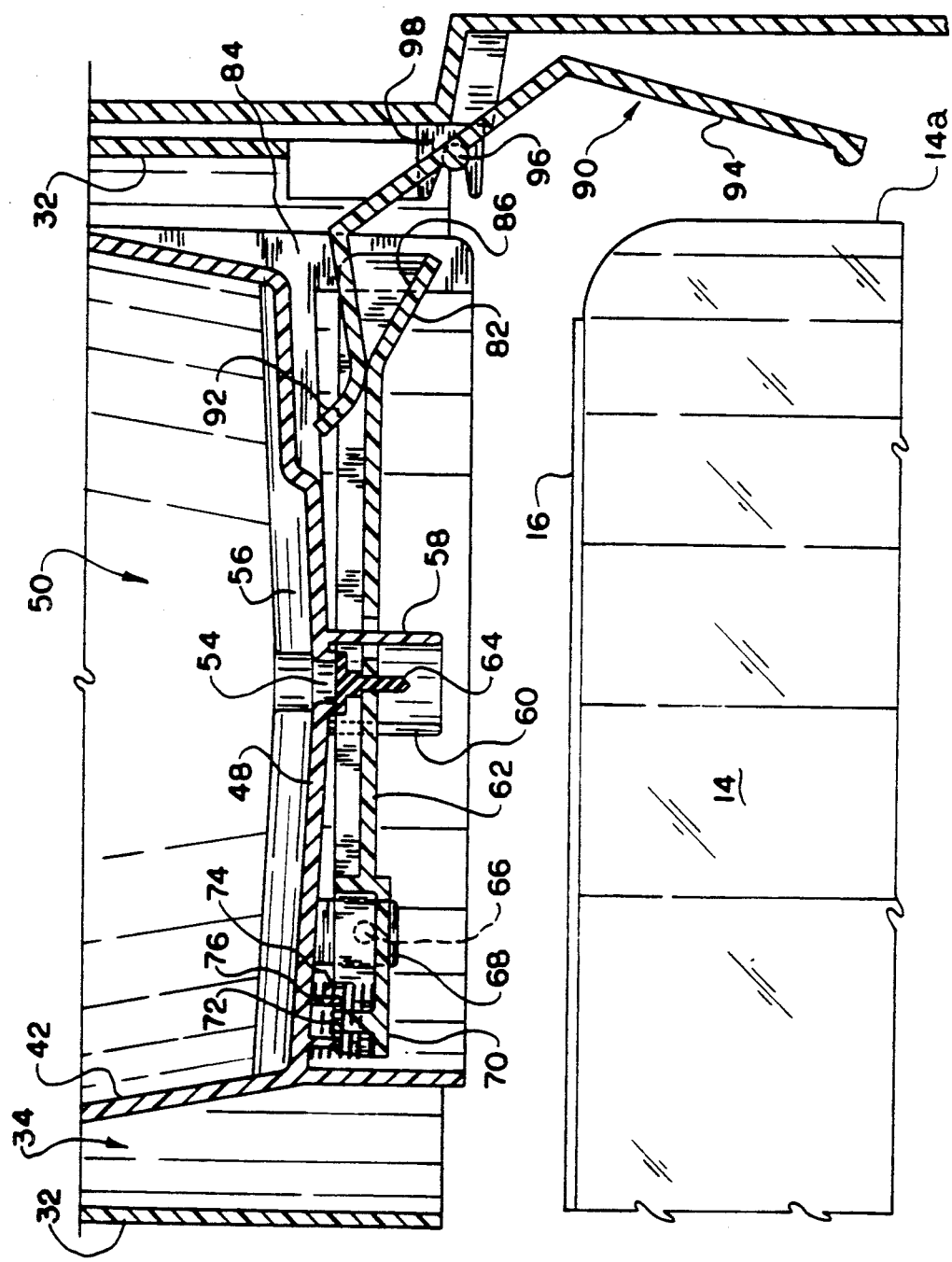
FIG. 5 is an enlarged view illustrating the anti-drip valve mechanism shown in FIG. 3 in a closed position.

With the embodiment shown, a user of appliance 10 may temporarily remove carafe 14 therefrom. In this respect, when carafe 14 is removed, actuator 90 no longer restrains movement of valve lever 62, which valve lever 62 under the influence of compression spring 74 moves to its first position as shown in FIG. 5 wherein valve 64 covers outlet port 54 and prevents flow therethrough. When carafe 14 is returned to warming plate 28, side 14a thereof once again causes actuator 90 to return valve lever 62 to its second position as shown in FIG. 4 wherein flow through outlet port 54 is permitted.

If filter/brew funnel 40 is removed from appliance 10, the valve arrangement shown is likewise operable to prevent flow through outlet port 54 by allowing valve lever 62 to assume its first position wherein valve 64 obstructs outlet port 54. In this respect, in the embodiment shown, filter/brew funnel 40 would be removed from appliance 10 by swinging closure 26 out from under cover or cap 24. As closure 26 is swung out from under cap 24, filter/brew funnel 40 would move to the left from the position shown in FIG. 4. In this respect, lever 62 would disengage actuator 90 wherein valve lever 62 would be biassed by compression spring 74 toward its first position wherein outlet port 54 would be covered by valve or plug 64. Thus, irrespective of whether carafe 10 is present or absent from warming plate 28, valve lever 62 would close outlet port 54.

When filter/brew funnel 40 is returned to its operative position, ramp 86 on valve lever 62 guides upper arm 92 of actuator 90 to its operative position between conical wall 48 of filter/brew funnel 40 and the upper surface of valve lever 62. Importantly, to ensure proper operative engagement between valve lever 62 and actuator 90, actuator 90 is preferably dimensioned to assume the position shown in FIG. 4, irrespective of whether carafe 14 is on warming plate 28 or whether filter/brew funnel 40 is in closure 26. In this respect, the position of upper arm 92 relative to mounting pin 94 would create a counter clockwise moment on actuator 90 which causes it to normally assume the position shown in FIG. 4 in absence of contact with a filter/brew funnel 40 or carafe 14. Thus, actuator 90 is always in a proper position to engage ramp 86 on valve lever 62 when filter/brew funnel 40 is replaced in appliance 10.

The present invention thus provides an electric coffee maker with an anti-drip valve arrangement which is simple and reliable. Importantly, an anti-drip valve arrangement according to the present invention operates off the side of the carafe. Operation of such an arrangement is almost imperceptible compared to existing devices which operate off a lid mounted to the carafe. In this respect, the present invention eliminates the "snagging" or "catching" of the upper lip of the cover or the carafe which are associated with valve arrangements known heretofore. In another respect, the present arrangement allows for operation of the anti-drip valve even if the lid of the carafe is removed, thereby avoiding messy and hazardous overflows of the filter/brew funnel. The foregoing advantages are the result of a valve arrangement which is actuated by the side of the carafe, rather than a lid associated therewith.

The mechanical arrangement of the present invention permits a greater biasing force to be exerted on valve 64 against outlet port 54 without unduly affecting the operation and ease of movement of the carafe relative to appliance 10. Importantly, valve lever 62 and actuator 90 as dimensioned and disclosed in the present invention provide a mechanical advantage not found in valve arrangements known heretofore. In this respect, the component engaging the carafe moves in the same direction, i.e. horizontal, as the carafe (which is placed on a coffee maker in a generally horizontal direction) and is operative to move a valve downward, i.e. vertically, away from the outlet in the filter/brew funnel. Such an arrangement, provides a mechanical advantage not found in prior devices wherein the component engaging the upper surface of the carafe generally moves upward, i.e. vertically, and must move the valve downward in a generally opposite direction.

The present invention has been described with respect to preferred embodiments. Other modifications and alterations will appear to others skilled in the art upon the reading and understanding of the present disclosure. It is intended that all such alterations and modifications fall within the scope of the patent as claimed and the equivalence thereof.

Having described the invention, the following is claimed: claimed:

1. An electric coffee maker comprised of:
   a housing structure defining a carafe receiving position and support means disposed about said carafe receiving position, a filter/brew funnel for receiving brewing particulate and brewing water, said filter/brew funnel dimensioned to be supportrd by said supported by said support means above said carafe receiving position and including an outlet port, and a downward extending wall surrounding said outlet port defining a drip surface disposed below said valve, valve means including a valve dimensioned to cover said outlet port, a valve lever supporting said valve and being pivotally mounted to said filter/brew funnel such that said valve lever is movable between a first position wherein said valve closes said outlet port and a second position wherein said valve is disposed away from said otlet port, and biasing means biasing said valve lever toward said first position, and an elongated valve means actuator pivotally mounted about a generally horizontal axis to said housing, said actuating arm having an upper arm dimensioned to engage said valve lever when said filter funnel is support by said support means above said carafe receiving position and a lower arm dimensioned to generally engage a surface on or associated with a carafe which may be positioned within carafe receiving position, said actuator being biased by said valve means biasing means towards a first position wherein said lower arm of said actuator is disposed within the space normally occupied by a carafe placed in said carafe receiving position to cause said actuator to move to a second position wherein upper arm is operable to move valve lever to its second position.

2. A coffee maker as defined in claim 1 wherein valve lever moves in a generally downward direction from said first position to said second position.

3. A coffee maker as defined in claim 1 wherein said valve lever is an elongated generally flat plate, one end of which is pivotally mounted to said filter/brew funnel and the other end of which includes a ramp portion to faciliate operative engagement with said upper arm of said actuator when said filter/brew funnel is positioned on said support means.

4. A coffee maker as defined in claim 1 wherein said lower arm of said actuator engages said carafe.

5. An electric coffee maker comprised of:

a housing having structure defining a carafe receiving position and support means disposed above said carafe receiving position, a filter/brew funnel for receiving brewing particulate and brewing water; said filter/brew funnel dimensioned to be supported by said support means above said carafe receiving position and including an outlet port, valve means including a valve dimensioned to cover said outlet port, a valve lever supporting said valve and being pivotally mounted to said filter/brew funnel such that said valve lever is movable between a first position wherein said valve closes said outlet port and a second position wherein said valve is disposed away from said outlet port, and biasing means biasing said valve lever toward said first position, an actuator pivotally mounted about a generally horizontal axis to said housing, said actuator having an upper end dimensioned to engage said valve lever when said filter funnel is supported by said support means abive said carafe receiving position and an arm dimensioned to engage a surface on or movable with a carafe which may be positioned within carafe receiving position, said actuator being operable to move said valve lever to its second position when a carafe is in said carafe receiving position, and extension means associated with said outlet port defining a drip surface disposed below said valve.

* * * * *